US007145341B2

(12) United States Patent
Ellingsrud et al.

(10) Patent No.: US 7,145,341 B2
(45) Date of Patent: *Dec. 5, 2006

(54) METHOD AND APPARATUS FOR RECOVERING HYDROCARBONS FROM SUBTERRANEAN RESERVOIRS

(75) Inventors: Svein Ellingsrud, Trondheim (NO); Terje Eidesmo, Ranheim (NO); Fan-Nian Kong, Oslo (NO); Harald Westerdahl, Dal (NO)

(73) Assignee: Electromagnetic Geoservices AS, Trondheim (NO)

( * ) Notice: Subject to any disclaimer, the term of this patent is extended or adjusted under 35 U.S.C. 154(b) by 0 days.

This patent is subject to a terminal disclaimer.

(21) Appl. No.: 10/919,842

(22) Filed: Aug. 17, 2004

(65) Prior Publication Data

US 2005/0017722 A1 Jan. 27, 2005

Related U.S. Application Data

(63) Continuation of application No. 10/123,867, filed on Apr. 16, 2002, now Pat. No. 6,859,038, which is a continuation of application No. PCT/GB01/00419, filed on Feb. 1, 2001.

(30) Foreign Application Priority Data

Feb. 2, 2000 (GB) ................................ 0002422.4

(51) Int. Cl.
*G01V 3/08* (2006.01)
*G01V 3/12* (2006.01)

(52) U.S. Cl. ...................................... 324/334; 324/337

(58) Field of Classification Search .............. 324/323, 324/324, 334, 337, 338, 339, 365; 166/66; 367/14, 36, 37

See application file for complete search history.

(56) References Cited

U.S. PATENT DOCUMENTS

| 2,077,707 | A | 4/1937 | Melton |
| 2,531,088 | A | 11/1950 | Thompson |
| 3,052,836 | A | 9/1962 | Postma |
| 3,398,356 | A | 8/1968 | Still |
| 3,548,299 | A | 12/1970 | Duroux et al. |
| 3,806,795 | A | 4/1974 | Morey |
| 4,010,413 | A | 3/1977 | Daniel |
| 4,047,098 | A | 9/1977 | Duroux |
| 4,079,309 | A | 3/1978 | Seeley |
| 4,258,321 | A | 3/1981 | Neale, Jr. |
| 4,258,322 | A | 3/1981 | Rocroi et al. |
| 4,308,499 | A | 12/1981 | Thierbach et al. |
| 4,417,210 | A | 11/1983 | Rocroi et al. |
| 4,446,434 | A | 5/1984 | Sternberg et al. |

(Continued)

FOREIGN PATENT DOCUMENTS

EP 0087271 8/1983

(Continued)

OTHER PUBLICATIONS

Chave et al., "Some Comments on Seabed Propagation of ULF/ELF Electromagnetic Fields", 25 Radio Science 825-36 (Sep. 1990).

(Continued)

*Primary Examiner*—Jay M. Patidar
(74) *Attorney, Agent, or Firm*—Patterson, Thuente, Skaar & Christensen, P.A.

(57) ABSTRACT

The present invention relates to a system and apparatus for detecting and recovering hydrocarbons located in a subterranean reservoir In some embodiments, an electromagnetic field is applied by a transmitter positioned on a seabed and detected by antenna also positioned on the seabed.

30 Claims, 3 Drawing Sheets

U.S. PATENT DOCUMENTS

| | | | |
|---|---|---|---|
| 4,451,789 A | 5/1984 | Meador |
| 4,489,276 A | 12/1984 | Yu |
| 4,506,225 A | 3/1985 | Loveless et al. |
| 4,547,733 A | 10/1985 | Thoraval |
| 4,594,551 A | 6/1986 | Cox et al. |
| 4,616,184 A | 10/1986 | Lee et al. |
| 4,617,518 A | 10/1986 | Srnka |
| 4,633,182 A | 12/1986 | Dzwinel |
| 4,652,829 A | 3/1987 | Safinya |
| 4,760,340 A | 7/1988 | Denzau et al. |
| 4,835,474 A | 5/1989 | Parra et al. |
| 5,025,218 A | 6/1991 | Ramstedt |
| 5,066,916 A | 11/1991 | Rau |
| 5,177,445 A | 1/1993 | Cross |
| 5,192,952 A | 3/1993 | Johler |
| 5,280,284 A | 1/1994 | Johler |
| 5,373,443 A | 12/1994 | Lee et al. |
| 5,400,030 A | 3/1995 | Duren et al. |
| H1490 H | 9/1995 | Thompson et al. |
| 5,486,764 A | 1/1996 | Thompson et al. |
| H1524 H | 4/1996 | Thompson et al. |
| H1561 H | 7/1996 | Thompson |
| 5,563,513 A | 10/1996 | Tasei et al. |
| 5,689,068 A | 11/1997 | Locatelli et al. |
| 5,767,679 A | 6/1998 | Schroder |
| 5,811,973 A | 9/1998 | Meyer, Jr. |
| 5,841,280 A | 11/1998 | Yu et al. |
| 5,877,995 A | 3/1999 | Thompson et al. |
| 5,886,526 A | 3/1999 | Wu |
| 5,892,361 A | 4/1999 | Meyer, Jr. et al. |
| 5,955,884 A | 9/1999 | Payton et al. |
| 6,002,357 A | 12/1999 | Redfern et al. |
| 6,023,168 A | 2/2000 | Minerbo |
| 6,060,885 A | 5/2000 | Tabarovsky et al. |
| 6,157,195 A | 12/2000 | Vail, III |
| 6,163,155 A | 12/2000 | Bittar |
| 6,184,685 B1 | 2/2001 | Paulk et al. |
| 6,188,221 B1 | 2/2001 | Van de Kop et al. |
| 6,188,222 B1 | 2/2001 | Seydoux et al. |
| 6,225,806 B1 | 5/2001 | Millar et al. |
| 6,246,240 B1 | 6/2001 | Vail, III |
| 6,339,333 B1 | 1/2002 | Kuo |
| 6,480,000 B1 | 11/2002 | Kong |
| 2003/0048105 A1 | 3/2003 | Ellingsrud et al. |
| 2003/0052685 A1 | 3/2003 | Ellingsrud et al. |

FOREIGN PATENT DOCUMENTS

| | | |
|---|---|---|
| EP | 0219234 | 4/1987 |
| EP | 0512756 | 11/1991 |
| EP | 0814349 | 12/1997 |
| FR | 2479992 | 10/1981 |
| GB | 2155182 | 9/1985 |
| GB | 2256715 | 12/1992 |
| GB | 2301902 | 12/1996 |
| WO | WO81/01617 | 6/1981 |
| WO | WO96/06367 | 2/1996 |
| WO | WO98/28638 | 7/1998 |
| WO | WO00/00850 | 1/2000 |
| WO | WO00/13046 | 3/2000 |
| WO | WO00/13037 | 9/2000 |
| WO | WO00/63718 | 10/2000 |
| WO | WO01/55749 | 8/2001 |
| WO | WO02/14906 | 2/2002 |

OTHER PUBLICATIONS

Edwards, "On the Resource evaluation of Marine Gas Hydrate Deposits Using Sea-Floor Transient Electric Dipole-Dipole Methods", 62 Geophysics 63-74 (Jan. 1997).

Eidesmo et al., "Sea Bed Logging (SBL), a new method for remote and direct identification of hydrocarbon filled layers in deepwater areas", 20 First Break (Mar. 2002).

Ellingsrud et al., "How Electromagnetic Sounding Technique Could be Coming to Hydrocarbon E & P", 20 First Break (Mar. 2002).

Garg et al., "Synthetic Electric Sounding Surveys Over Known Oil Fields", 49 Geophysics 1959-67 (Nov. 1984).

Kaufman et al., "EM Field of an Electric Dipole on the Surface of a Medium Containing a Thin Resistant Layer", Frequency and Transient Soundings, publ. Elsevier, (1983).

Kaufman et al., 1981 Annual Meeting Abstracts: Marine EM Prospecting System, 47 Geophysics 431 (1982).

MacGregor et al., "Marine Controlled Source Electromagnetic Sounding: Development of a Regularized Inversion for 2-Dimensional Resistivity Structures", 1 LITHOS Science Report 103-109 (Apr. 1999).

MacGregor et al., "The RAMESSES Experiment—III. Controlled-Source Electromagnetic Sounding of the Reykjanes Ridge", 135 Geophys. J. Int. 773-89 (Jul. 1998).

MacGregor et al., "Use of Marine Controlled-Source Electromagnetic Sounding for Sub-Basalt Exploration", 48 Geophys. Prosp. 1091-1106 (Apr. 2000).

Sinah et al., "Evidence for Accumulated Melt Beneath the Slow-Spreading Mid-Atlantic Ridge," 355 Phil. Trans. R. Soc. Lond. A 233-53 (Jan. 1997).

Sinah et al., "Magmatic Processes at Slow Spreading Ridges: Implications of the RAMESSES Experiment at 57 deg. 45'N on the Mid-Atlantic Ridge," 135 Geophys. J. Int. 731-45 (Jul. 1998).

Yuan et al., "The Assessment of Marine Gas Hydrates Through Electrical Remote Sounding: Hydrate Without a BSR?", 27 Geophys. Res. Letts. 204-217 (Aug. 15, 2000).

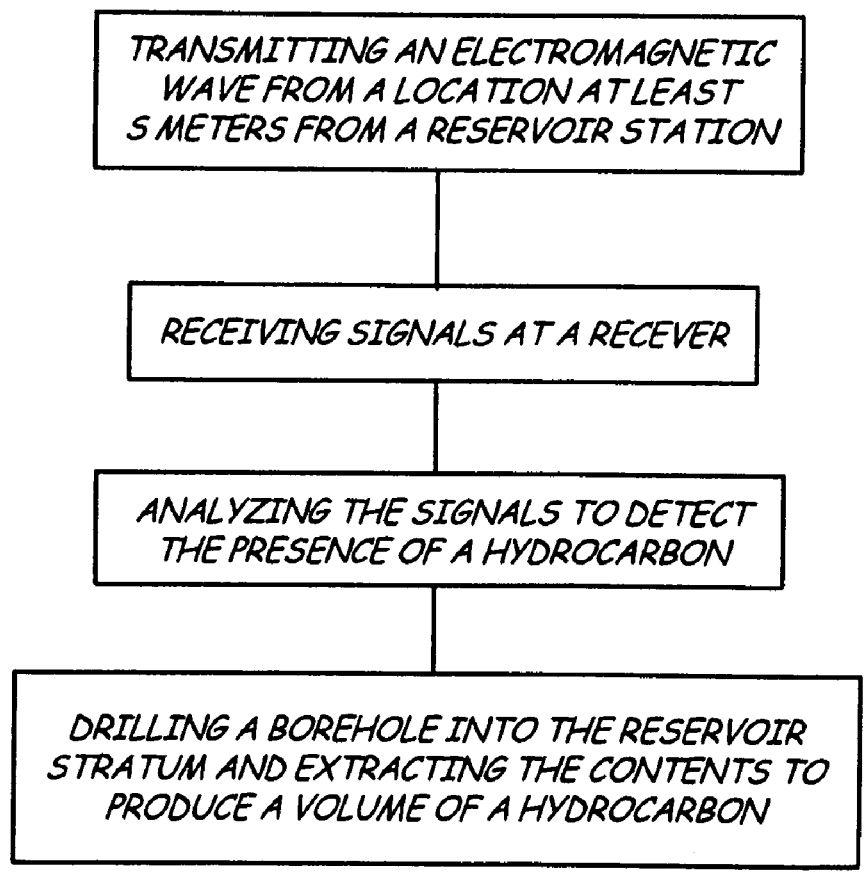

METHOD AND APPARATUS FOR RECOVERING HYDROCARBONS FROM SUBTERRANEAN RESERVOIRS

RELATED APPLICATIONS

This application is a continuation of U.S. application Ser. No. 10/123,867, filed on Apr. 16, 2002 now U.S. Pat. No. 6,859,038, which is a continuation of pending and commonly assigned international patent application PCT/GB01/00419, entitled "Method and Apparatus for Determining the Nature of Subterranean Reservoirs", filed Feb. 1, 2001, which claims priority to patent application GB 0002422.4 filed Feb. 2, 2000, which are all hereby incorporated by reference herein.

BACKGROUND

The present invention relates to a method and apparatus for determining the nature of submarine and subterranean reservoirs. The invention is particularly suitable for determining, whether a reservoir, whose approximate geometry and location are known, contains hydrocarbons or water, though it can also be applied to detecting reservoirs with particular characteristics.

Currently, the most widely used techniques for geological surveying, particularly in sub-marine situations, are seismic methods. These seismic techniques are capable of revealing the structure of the subterranean strata with some accuracy. However, whereas a seismic survey can reveal the location and shape of a potential reservoir, it cannot reveal the nature of the reservoir.

The solution therefore is to drill a borehole into the reservoir. However, the costs involved in drilling an exploration well tend to be in the region of £25 M and since the success rate is generally about 1 in 10, this tends to be a very costly exercise.

SUMMARY OF THE INVENTION AND DETAILED DESCRIPTION OF PREFERRED EMBODIMENTS

It is therefore an object of the invention to provide a system for determining, with greater certainty, the nature of a subterranean reservoir without the need to sink a borehole.

According to one aspect of the invention, there is provided a method of determining the nature of a subterranean reservoir whose approximate geometry and location are known, which comprises: applying a time varying electromagnetic field to the strata containing the reservoir; detecting the electromagnetic wave field response; seeking in the wave field response, a component representing a refracted wave from the hydrocarbon layer; and determining the content of the reservoir, based on the presence or absence of a wave component refracted by the hydrocarbon layer. Once a reservoir is located having hydrocarbon content, a borehole can be drilled into the reservoir stratum and the hydrocarbon can be removed to produce a volume of hydrocarbon. According to a second aspect of the invention there is provided a method for searching for a containing subterranean reservoir which invention, there hydrocarbon comprises: applying a time varying electromagnetic field to subterranean strata; detecting the electromagnetic wave field response; seeking, in the wave field response, a component representing a refracted wave; and determining the presence and/or nature of any reservoir identified based on the presence or absence of a wave component refracted by hydrocarbon layer.

According to a further aspect of the invention, there is provided apparatus for determining the nature of a subterranean reservoir whose approximate geometry and location are known, or for searching for a hydrocarbon containing subterranean reservoir, the apparatus comprising: means for applying a time varying electromagnetic field to the strata containing the reservoir; means for detecting the electromagnetic wave field response; and means for seeking, in the wave field response, a component representing a refracted wave, thereby enabling the presence and/or nature of a reservoir to be determined.

It has been appreciated by the present applicants that while the seismic properties of oil-filled strata and water-filled strata do not differ significantly, their electromagnetic resistivities and permittivities differ. Thus, by using an electromagnetic surveying method, these differences can be exploited and the success rate in predicting the nature of a reservoir can be increased significantly. This represents potentially an enormous cost saving.

The present invention arises from an appreciation of the fact that when an (electromagnetic) EM field is applied to subterranean strata which include a reservoir, in addition to a direct wave component and a reflected wave component from the reservoir, the detected wave field response will include a "refracted" wave component from the reservoir. The reservoir containing hydrocarbon is acting in some way as a wave guide. For the purposes of this specification, however, the wave will be referred to as a "refracted wave", regardless of the particular mechanism which in fact pertains.

Be that as it may, a refracted wave behaves differently, depending on the nature of the stratum in which it is propagated. In particular, the propagation losses in hydrocarbon stratum are much lower than in a water-bearing stratum while the speed of propagation is much higher. Thus, when an oil-bearing reservoir is present, and an EM field is applied, a strong and rapidly propagated refracted wave can be detected. This may therefore indicate the presence of the reservoir or its nature if its presence is already known. Preferably, therefore, the method according to the invention further includes the step of analyzing the effects on any detected refracted wave component that have been caused by the reservoir in order to determine further the content of the reservoir, based on the analysis.

Preferably, the applied electromagnetic field is polarized. Preferably, the polarization is such as if created by in-line horizontal transmitter and receiver antennas.

If the offset between the transmitter and receiver is significantly greater than three times the depth of the reservoir from the seabed (i.e., the thickness of the overburden), it will be appreciated that the attenuation of the refracted wave will often be less than that of direct wave and the reflected wave. The reason for this is the fact that the path of the refracted wave will be effectively distance from the transmitter down to the reservoir i.e., the thickness of the overburden, plus the offset along the reservoir, plus the distance from the reservoir up to the receivers i.e., once again the thickness of the overburden.

The polarization of the source transmission will determine how much energy is transmitted into the oil-bearing layer in the direction of the receiver. A dipole antenna is therefore the preferred transmitter, though any transmitter capable of generating an appropriate polarized field can be used. In general, it is preferable to adopt a dipole with a large effective length. The transmitter dipole may therefore be 100 to 1000 meters in length, and may be 10 to 1000 meters preferably cross-polarized. The receiver Dipole optimum length is determined by the thickness of the overburden.

The technique is applicable in exploring land-based subterranean reservoirs but is especially applicable to submarine, in particular sub-sea, subterranean reservoirs. Preferably the field is applied using one or more transmitters located on the earth's surface, and the detection is carried out by one or more receivers located on the earth's surface. In a preferred application, the transmitter(s) and/or receivers are located on or close to the seabed or the bed of some other area of water. Conveniently, there will be a single transmitter and an array of receivers, the transmitter(s) and receivers being dipole antennae or coils, though other forms of transmitter/receivers can be used. The transmitter may be in an existing well. Also, if improved directionality of the emitted field is desirable, then a plurality of transmitters with phase adjustment can be used.

In one arrangement, a single transmitter and several receivers are arranged on a single cable which is laid in the required position on the seabed by a surface or submarine vessel 50. These can then be moved to another location. In a second arrangement, several receivers have fixed positions on the seabed. The transmitter can be moved to different locations. In a third arrangement, a transmitter may be positioned by a first vessel while a second vessel positions one or more receivers. This affords flexibility in the positioning of both transmitter and receivers. In a fourth arrangement, that the transmitter be in an existing well while the receivers may constitute a fixed matrix or they may be movable.

It will be appreciated that the present invention may be used to determine the position, the extent, the nature and the volume of a particular stratum, and may also be used to detect changes in these parameters over a period of time. Electromagnetic surveying techniques in themselves are known. However, they are not widely used in practice. In general, the reservoirs of interest are about 1 km or more below the seabed. In order to carry out electromagnetic surveying as a stand alone technique in these conditions, with any reasonable degree of resolution, short wavelengths are necessary. Unfortunately, such short wavelengths suffer from very high attenuation. Long wavelengths do not provide adequate resolution. For these reasons, seismic techniques are preferred.

However, while longer wavelengths applied by electromagnetic techniques cannot provide sufficient information to provide an accurate indication of the boundaries of the various strata, if the geological structure is already known, they can be used to determine the nature of a particular identified formation, if the possibilities for the nature of that formation have significantly differing electromagnetic characteristics. The resolution is not particularly important and so longer wavelengths which do not suffer from excessive attenuation can be employed.

The resistivity of seawater is about 0.3 ohm-m and that of the overburden beneath the seabed would typically be from 0.3 to 4 ohm-m, for example about 2 ohm-m. However, the resisitivty of an oil reservoir is likely to be about 20–300 ohm-m. This large difference can be exploited using the techniques of the present invention. Typically, the resisitvity of a hydrocarbon-bearing formation will be 20 to 300 times greater than water-bearing formation.

Due to the different electromagnetic properties of a gas/oil bearing formation and a water bearing formation, one can expect a reflection and refraction of the transmitted field at the boundary of a gas/oil bearing formation. However, the similarity between the properties of the overburden and a reservoir containing water means that no reflection or refraction is likely to occur.

The transmitted field may be pulsed, however, a coherent continuous wave with stepped frequencies is preferred. It may be transmitted for a significant period of time, during which the transmitter should preferably be stationary (although it could be moving slowly), and the transmission stable. Thus, the field may be transmitted for a period of time from 3 seconds to 60 minutes, preferably from 3 to 30 minutes, for example about 20 minutes. The receivers may also be arranged to detect a direct wave and a wave refracted from the reservoir, and the analysis may include extracting phase and amplitude data of the refracted wave from corresponding data from the direct wave.

Preferably, the wavelength of the transmission is given by the formula $$0.1S \leq \lambda \leq 5S;$$

where $\lambda$ is the wavelength of the transmission through the overburden and S is the distance from the seabed to the reservoir. More preferably $\lambda$ is from about 0.5S to 2S. The transmission frequency may be from 0.01 Hz to 1 kHz, preferably from 1 to 20 Hz, for example 5 Hz.

In a preferred regime, a first transmission is made at a first frequency and received by each receiver in a tuned array of receivers, then a second transmission is made at a second frequency and received by the same tuned array of receivers, the receivers being tuned to receive their respective transmission. This would probably be repeated several more times, though it may only be carried out once.

Preferably, the analysis includes comparing the results of the measurements taken with the results of a mathematical simulation model based on the known properties of the reservoir and overburden conditions.

Preferably, the distance between the transmitter and a receiver is given by the formula $$0.5\lambda \leq L \leq 10\lambda;$$

where $\lambda$ is the wavelength of the transmission through the overburden and L is the distance between the transmitter and the first receiver.

Given that the distances and the geometry of the reservoir will be known from previous seismic surveys, an optimum $\lambda$ and L would be selected.

Preferably, the analyzing means is arranged to analyze phase and amplitude. The data can be analyzed using time domain and frequency domain techniques, and other pulse sharpening techniques. Thus, the data can be made to mimic seismic data so that conventional seismic post-processing techniques can be employed.

If a location of interest is considered, a mathematical modeling operation may be carried out. Thus, the various relevant parameters, such as depth and expected resistivities of the various known strata in the overburden are applied to the mathematical model and the expected results are calculated in dependence upon whether a formation under consideration is oil-bearing or water-bearing. The theoretically predicted results can then be compared with the actual results achieved in the field in order to determine the nature of the formation.

The present invention also extends to a method of surveying subterranean measures which comprises; performing a seismic survey to determine the geological structure of a region; and where that survey reveals the presence of a subterranean reservoir, subsequently performing a method as described above.

The invention may be carried into practice in various ways and some embodiments will now be described by way of example with reference to the accompanying drawings, in which:

FIG. 3 depicts the steps of drilling a borehole into a reservoir stratum and producing a volume of a hydrocarbon.

Figure 1:
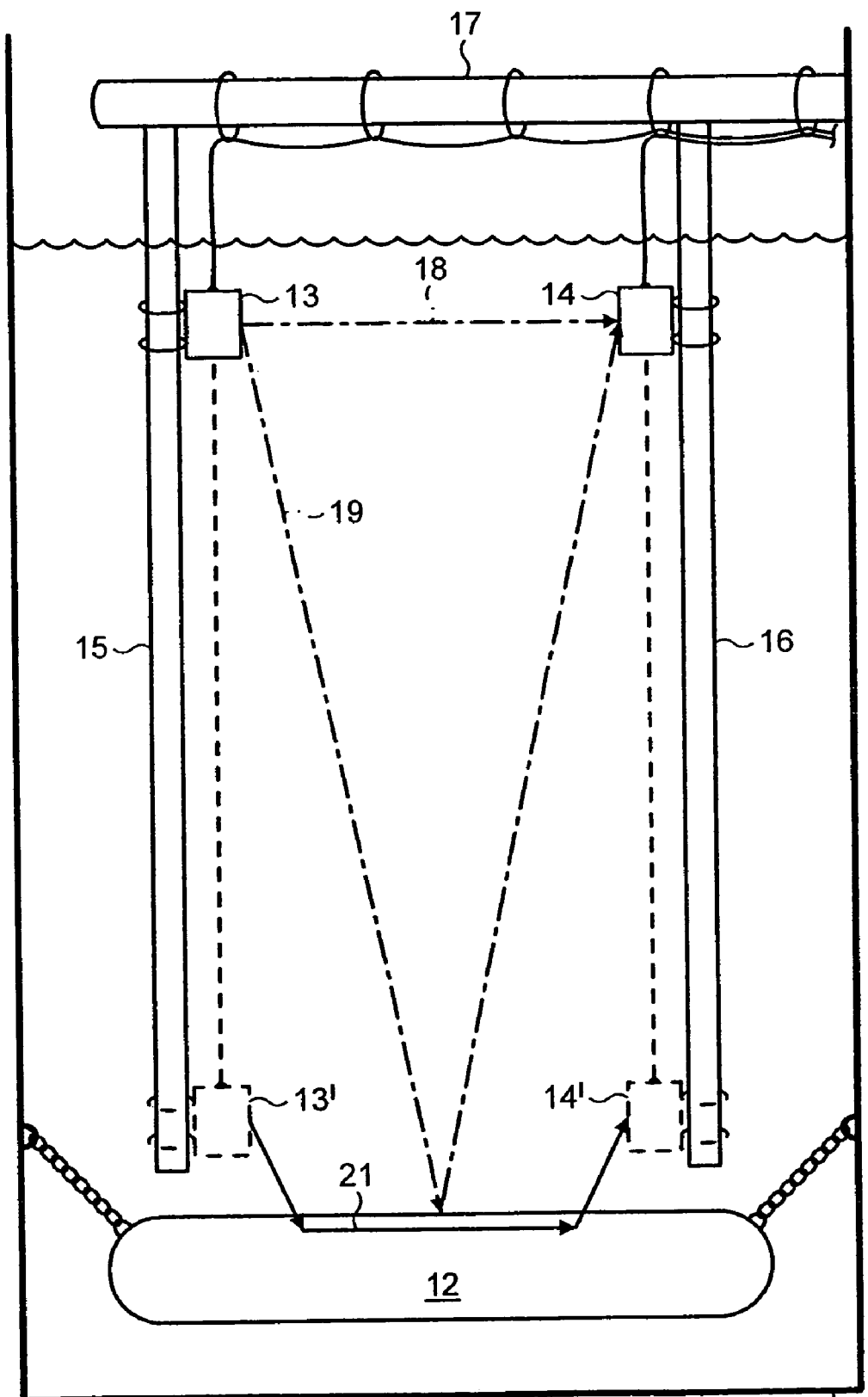
FIG. 1 is a schematic diagram of an experimental technique verifying the principles of the invention.

FIG. 1 shows a test rig comprising a tank 11 filled with seawater and a simulated oil-bearing layer, in the form of a diaphragm 12 filled with fresh water. The diaphragm 12 is suspended above the bottom of the tank 11. A transmitter 13 and a receiver 14 are mounted on respective vertical posts 15, 16 suspended from a beam 17. The posts are at a constant spacing L and the transmitter 13 and receiver 14 are vertically movable up and down their posts 15, 16.

When the transmitter 13 and receiver 14 are in the position shown in solid lines, the sensitivity of the receiver is adjusted so that the attenuation in the seawater is such that the direct wave 18 cannot be detected. Clearly, the reflected wave 19 would also be attenuated so much that it also would not be detected, given the greater distance of travel through the sea water.

The transmitter 13 and receiver 14 are then lowered down together, and transmissions made at intervals. At a particular depth indicated in broken lines, the receiver 14' detected a strong signal following a transmission from the transmitter 13'. This could not be a direct wave, nor a reflected wave, due to the attenuation by the seawater. It was therefore concluded that the only path for the wave to have taken was through the diaphragm 12. This is shown as a refracted wave 21.

The distance traveled through the seawater is relatively short and while the wave traveled some way through the fresh water in the diaphragm 12, the attenuation was considerably less than it would have been through the same distance in seawater. Thus, the overall attenuation was less than that for the direct wave 18 and the refracted wave 21 was detected.

Figure 2:
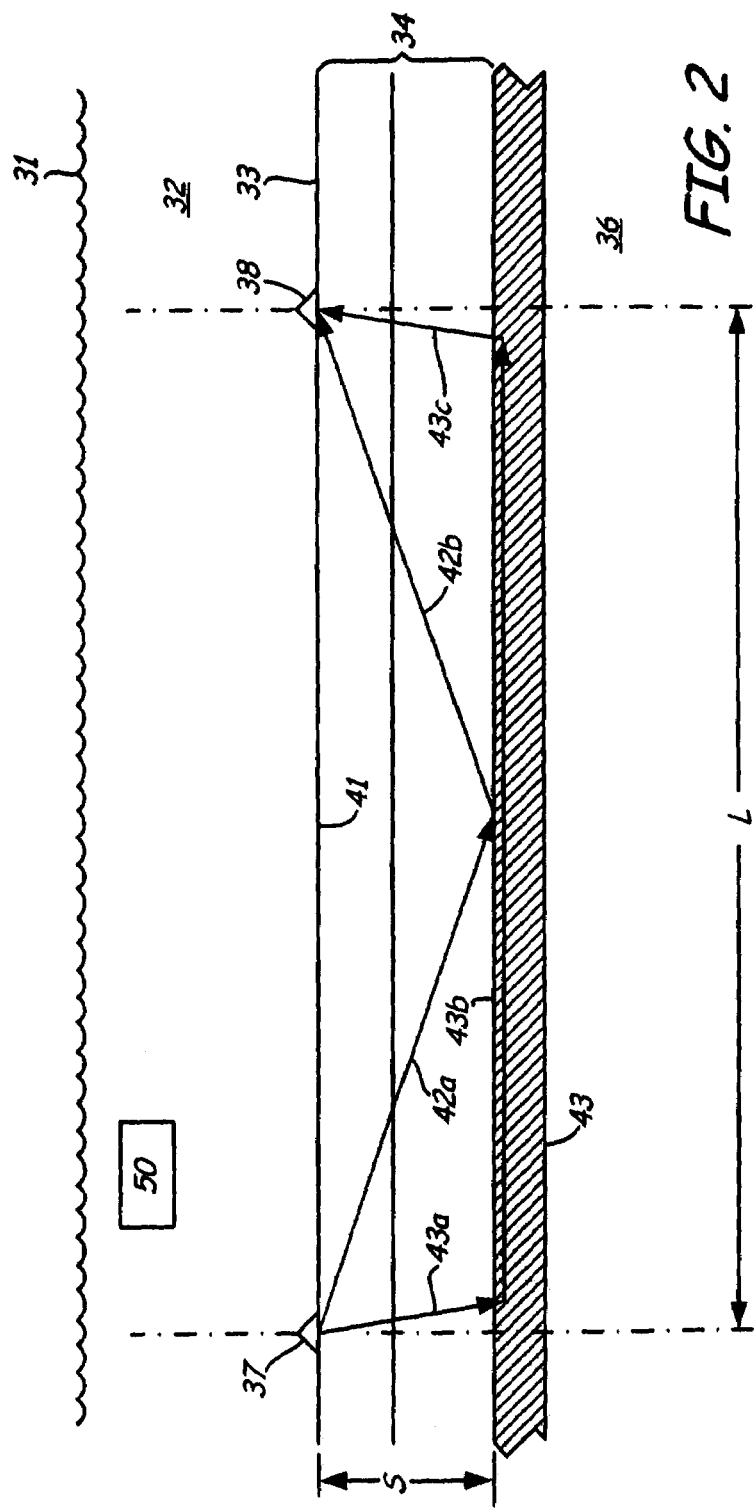
FIG. 2 is a schematic section of a system in accordance with the invention.

A more practical example is shown in FIG. 2. The surface of the sea is shown at 31 with the sea 32 extending down to the ocean floor 33. There is an overburden 34, an oil-bearing layer 35 and lower layer 36. This structure is known from seismic surveys, but the nature of the layers is not known. A transmitter is shown schematically at 37 on the ocean floor 33 and a receiver similarly at 38. They are spaced apart by an offset L.

The transmitter 37 is in the form of a dipole antenna which is arranged to transmit an electromagnetic wave polarized in such a way that the radial E component is generally along the line to receiver. This results in a direct wave 41 being propagated in the sea water along the surface of the overburden and a reflected wave 42a and 42b which proceeds through the overburden 34, strikes the top surface of the oil-bearing layer 35 and is reflected. The portions which are received by the receiver 38 are indicated.

The transmitted wave also results in a refracted wave 43. This is composed of a downward portion 43a which descends through the overburden 34, a refracted portion 43b which travels along the layer 35, and an upward portion 43c which travels back up through the overburden 34. Since the refracted portion 43b travels much faster through the oil-bearing layer 35 and with far less attenuation, the refracted wave 43 is detected first by the detector 38 and at a relatively high signal level, compared to the direct wave 41 and the reflected wave 42a, 42b.

The refracted wave 43 is particularly adapted for determining the boundaries of an oil reservoir e.g., the layer 35, if its depth beneath the ocean floor 33 is known. This is due to the fact that the downward portion 43a of the refracted wave 43 mostly enters the layer 35 at the critical angle, which is approximately 10° for an oil bearing rock. At angles of greater than about 15°, total reflection at the surface of the layer 35 occurs.

Thus, by adopting various positions for the receiver 38, the boundaries of the oil reservoir can be determined, by the absence of an emerging refracted wave portion 43c, with accuracy.

This technique also lands itself conveniently to monitoring the changes in a reservoir, over a period of time. The absence of a detected refracted wave will mean that the boundary of the oil reservoir has moved and the oil content depleted.

In the test layout shown in FIG. 2, the seabed is 1000 m thick, and has a resistivity of 2 ohm-m. The hydrocarbon layer is about 50–100 m thick and has a resistivity of 50–100 ohm-m.

If the following parameters are then selected: Distance between the Tr antenna and the Re antenna=4000 m; Frequency=1.25 Hz; Transmitter antenna and receiver antenna effective lengths $L_T$ $L_R$=500 m (antenna physical length 1000 m). Transmitter current 200A.

Then the received signal (direct wave) will be about 5 μV. For f=2.5 Hz, the received voltage becomes 0.5 μV.

When the hydrocarbon layer has sufficiently large width, one can expect that the refracted wave will be stronger than the direct wave.

The invention claimed is:

1. A method for recovering a volume of hydrocarbons from a reservoir stratum covered by S meters of overburden and having an approximate geometry and location that are known comprising, using a source to transmit a transmitted electromagnetic wave from a location that is at least S meters distant from the reservoir stratum, with the transmitted electromagnetic wave having a wavelength of at least 0.1S and no more than 5S;

using a receiver to receive signals created by the transmitted electromagnetic wave;

analyzing the received signals for electromagnetic wave refraction signals to detect the presence of a hydrocarbon volume or water volume in the reservoir stratum; and, after detecting the presence of a hydrocarbon volume, producing the hydrocarbon volume from the reservoir stratum;

wherein the source is used to transmit the transmitted electromagnetic wave as a polarized transmitted electromagnetic wave, and the source further includes a dipole antenna to transmit an E-field component of the polarized transmitted electromagnetic wave such that the E-field component is approximately directed along a line between the antenna and the receiver.

2. The method of claim 1, wherein analyzing the received signals further comprises at least one member of the group consisting of using seismic data generated by a seismic survey, using the results of a mathematical simulation model based on a resistivity and a geometry of strata in the overburden, and using a resistivity of the reservoir stratum and overburden.

3. The method of claim 1, wherein the source is used to transmit the transmitted electromagnetic wave having a frequency between 0.01 and 20 Hz.

4. The method of claim 1, further comprising transmitting the transmitted electromagnetic wave when the source is kept stationary, the receiver is kept stationary, or both the source and the receiver are kept stationary.

5. The method of claim 1, further comprising transmitting the transmitted electromagnetic wave to the reservoir stratum when the reservoir stratum is a submarine reservoir stratum under at least 300 m of seawater.

6. The method of claim 1, comprising transmitting the transmitted electromagnetic wave from the source for a length of time between 3 seconds and 60 minutes.

7. The method of claim 1, wherein the hydrocarbon comprises oil or natural gas.

8. The method of claim 1, further comprising using a surface or submarine vessel for disposing the system in a marine environment.

9. The method of claim 1, wherein the source and the receiver are separated by an offset distance that is at least three times S meters.

10. The method of claim 1, further comprising separating the source and the receiver by a distance, L, that is within a range described by the formula $0.5\lambda \leq L \leq 10\lambda$ wherein X is the wavelength of the transmitted electromagnetic wave.

11. The method of claim 1, further comprising suppressing a direct wave generated by the transmitted electromagnetic wave.

12. The method of claim 1, further comprising drilling a borehole into the reservoir stratum.

13. A method for generating data for determining the nature of a reservoir stratum covered by S meters of overburden and having an approximate geometry and location that are known, the method comprising:
transmitting, from a dipole antenna source, a polarized transmitted electromagnetic wave with a frequency between 0.01 and 20 Hz at a location that is at least S meters distant from the reservoir stratum, wherein the transmitted electromagnetic wave has a wavelength of at least 0.1S and no more than 5S;
receiving, at a receiver, signals created by the transmitted electromagnetic wave;
with the E-field component of the polarized transmitted electromagnetic wave being approximately directed along a line between the antenna and the receiver;
generating output data from the signals; and
analyzing the output data for refraction signals to determine the presence of hydrocarbon or water in the reservoir stratum.

14. The method of claim 13, wherein analyzing the output data further comprises at least one member of the group consisting of using seismic data generated by a seismic survey, using the results of a mathematical simulation model based on a resistivity and a geometry of strata in the overburden, and using a resistivity of the reservoir stratum and overburden.

15. The method of claim 13, further comprising transmitting the transmitted electromagnetic wave when the source is kept stationary, the receiver is kept stationary, or both the source and the receiver are kept stationary.

16. The method of claim 13, further comprising transmitting the transmitted electromagnetic wave to the reservoir stratum when the reservoir stratum is a submarine reservoir stratum under at least 300 m of seawater.

17. The method of claim 13, comprising transmitting the transmitted electromagnetic wave from the source for a length of time between 3 seconds and 60 minutes.

18. The method of claim 13, wherein the hydrocarbon comprises oil or natural gas.

19. The method of claim 13, further comprising using a surface or submarine vessel for disposing the system in a marine environment.

20. The method of claim 13, wherein the source and the receiver are separated by an offset distance that is at least three times S meters.

21. The method of claim 13, further comprising separating the source and the receiver by a distance, L, that is within a range described by the formula $0.5\lambda \leq L \leq 10\lambda$ wherein $\lambda$ is the wavelength of the transmitted electromagnetic wave.

22. The method of claim 13, further comprising suppressing a direct wave generated by the transmitted electromagnetic wave.

23. The method of claim 13, further comprising drilling a borehole into the reservoir stratum.

24. Data for determining the nature of a reservoir stratum covered by S meters of overburden and having an approximate geometry and location that are known, the data comprising:
refraction signals received at a receiver that are created by a polarized electromagnetic wave transmitted with a frequency between 0.01 and 20 Hz from a source that is located at least S meters distant from the reservoir stratum, wherein the transmitted electromagnetic wave has a wavelength of at least 0.1S and no more than 5S, with the E-field component of the polarized transmitted electromagnetic wave being approximately directed along a line between a dipole antenna and the receiver, and wherein the refraction signals are analyzable to determine the presence of hydrocarbon or water in the reservoir stratum.

25. The data of claim 24, further comprising at least one member of the group consisting of seismic data generated by a seismic survey, the results of a mathematical simulation model based on a resistivity and a geometry of strata in the overburden, and a resistivity of the reservoir stratum and overburden.

26. The data of claim 24, wherein the refraction signals received at the receiver comprise refraction signals from a submarine reservoir stratum under at least 300 m of seawater.

27. The data of claim 24, wherein the refraction signals received at the receiver comprise refraction signals collected when the transmitted electromagnetic wave is transmitted from the source for a length of time between 3 seconds and 60 minutes.

28. The data of claim 24, wherein the hydrocarbon comprises oil or natural gas.

29. The data of claim 24, wherein the refraction signals received at the receiver comprise refraction signals collected when the source and the receiver are separated by an offset distance that is at least three times S meters.

30. The data of claim 24, wherein the refraction signals received at the receiver comprise refraction signals collected when the source and the receiver are separated by a distance, L, that is within a range described by the formula $0.5\lambda \leq L \leq 10\lambda$ wherein $\lambda$ is the wavelength of the transmitted electromagnetic wave.

* * * * *

UNITED STATES PATENT AND TRADEMARK OFFICE
CERTIFICATE OF CORRECTION

PATENT NO. : 7,145,341 B2 Page 1 of 1
APPLICATION NO. : 10/919842
DATED : December 5, 2006
INVENTOR(S) : Ellingsrud et al.

It is certified that error appears in the above-identified patent and that said Letters Patent is hereby corrected as shown below:

Column 3, Line 35:

Begin a new paragraph with "Electromagnetic".

Column 4, Lines 19, 40:

Delete "≦" and insert --≤--.

Column 7, Line 28:

After "wherein" delete "X" and insert --λ--.

Column 8, Line 16, 63, 64:

Delete "≦" and insert --≤--.

Signed and Sealed this

Twenty-eighth Day of August, 2007

JON W. DUDAS
*Director of the United States Patent and Trademark Office*